Feb. 26, 1929.　　　　　　　　　　　　　　　　　1,703,349
C. H. MANION
ROLL ADJUSTING MECHANISM
Filed June 4, 1927　　　3 Sheets-Sheet 1

Chas H Manion
INVENTOR

By N. E. Dunlap
ATTORNEY

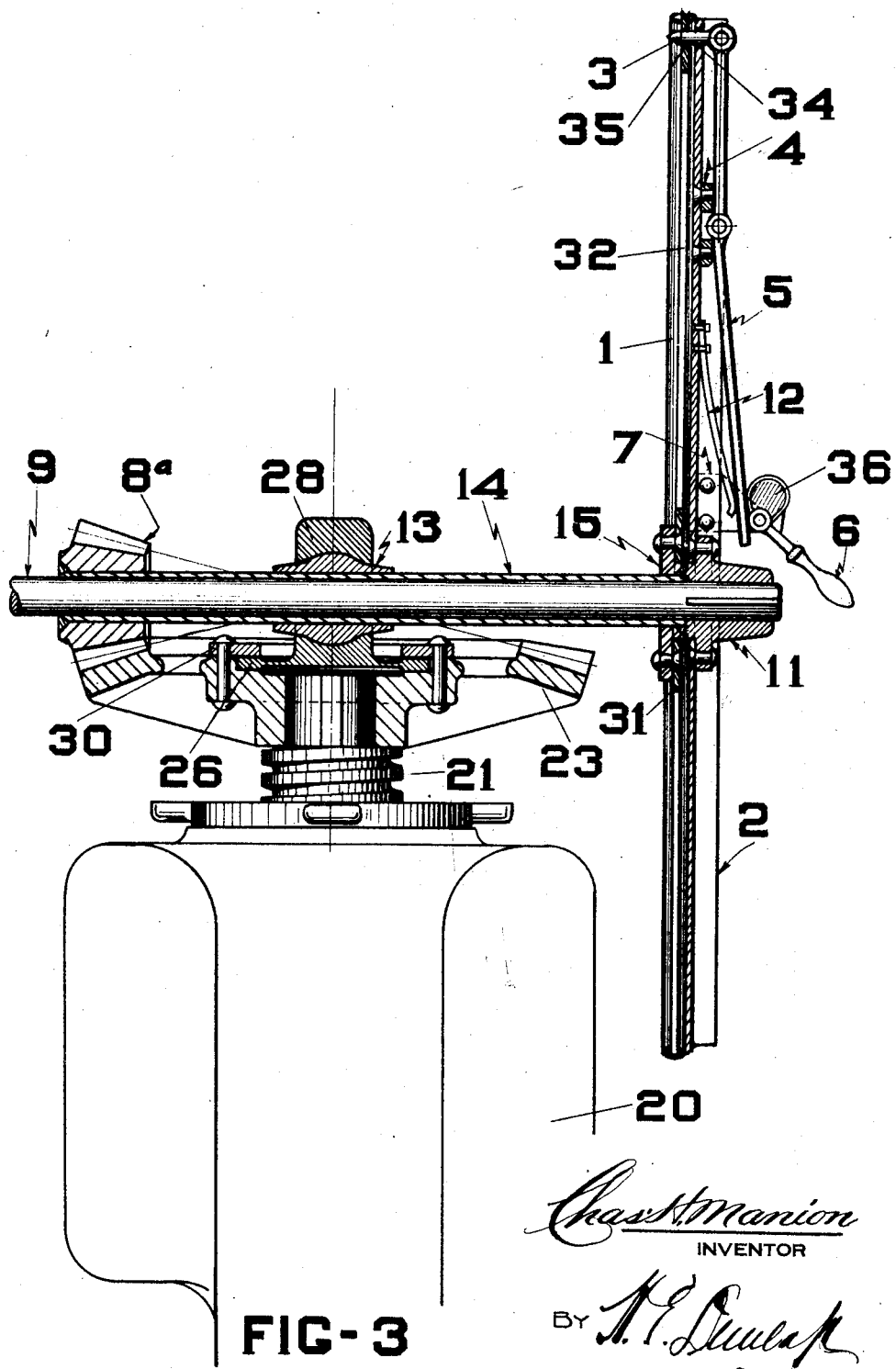

Patented Feb. 26, 1929.

1,703,349

UNITED STATES PATENT OFFICE.

CHARLES H. MANION, OF FOLLANSBEE, WEST VIRGINIA, ASSIGNOR TO FOLLANSBEE BROTHERS COMPANY, OF PITTSBURGH, PENNSYLVANIA, A CORPORATION OF PENNSYLVANIA.

ROLL-ADJUSTING MECHANISM.

Application filed June 4, 1927. Serial No. 196,581.

This invention relates broadly to rolling mills, and more specifically to an adjusting mechanism for the rolls of such mills.

The primary object of the invention is to provide, in association with the roll-pressure adjusting screws of a rolling mill, a mechanism whereby either end of the top roll of the mill, may, independently of the other, be adjusted relative to the underlying roll for disposing said rolls in parallelism, and also whereby the opposite ends of the top roll may be simultaneously and uniformly adjusted to vary the width of the operating space between the rolls.

A further object is to provide a mechanism of the character mentioned which embodies means whereby accurate individual adjustment of the pressure screws may be effected with promptness and facility.

With these and other objects in view, the invention resides in the features of construction, arrangement of parts and combinations of elements which will hereinafter be fully described, reference being had herein to the accompanying drawings, in which—

Figure 3 is an enlarged broken section illustrating a modification.

Figure 1:
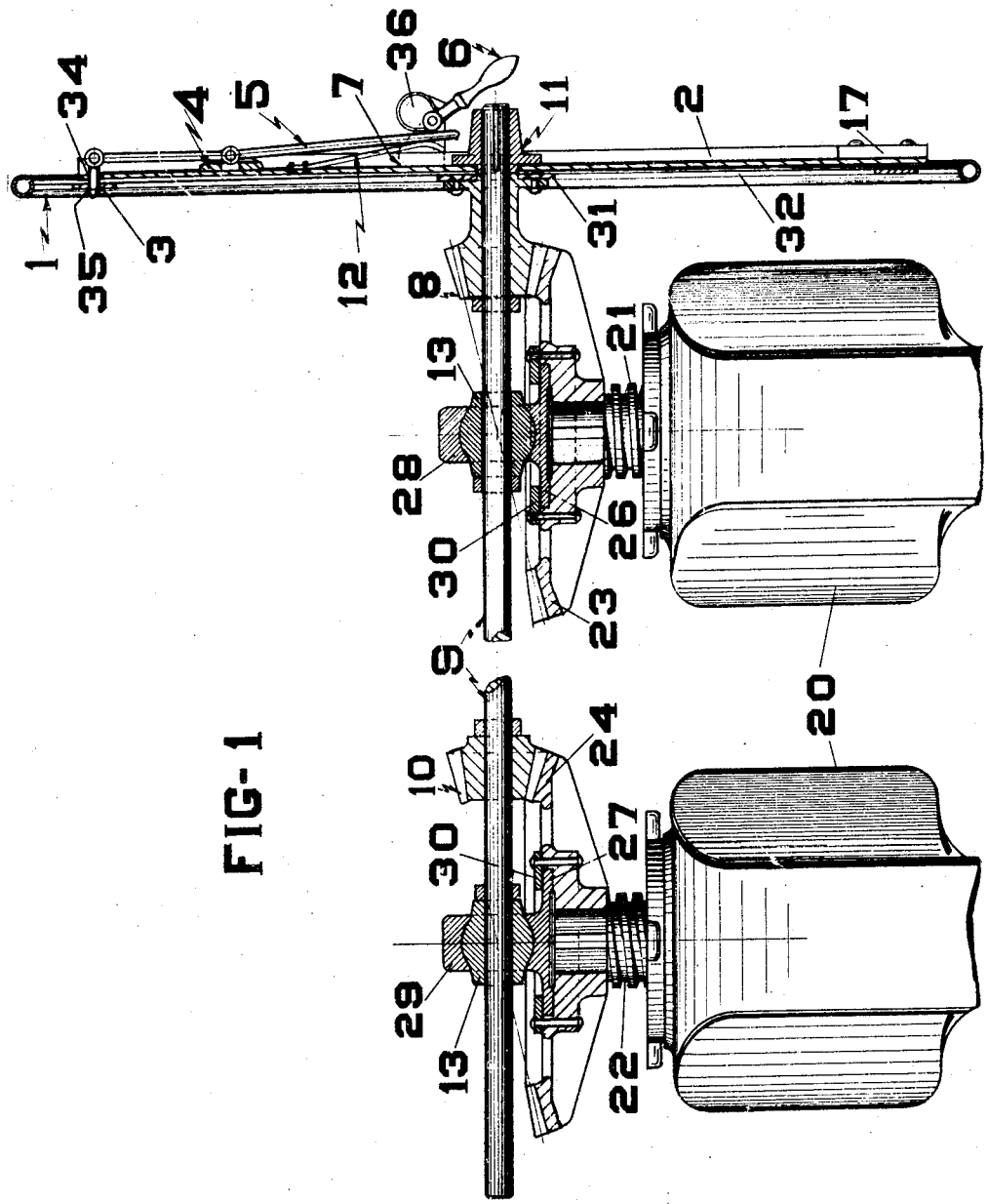
Figure 1 is a longitudinal section of a roll adjusting mechanism, or "screw-down", embodying my invention.

Referring to said drawings, 20 designates the roll housings, and 21 and 22 the roll adjusting pressure screws of a rolling mill. Carried by said screws 21 and 22, respectively, are bevel gears 23 and 24 which have in their upper faces centrally located seats upon which are received circular flanges 26 and 27 formed upon head-pieces 28 and 29 and confined in place by rings 30 bolted to the gears 23 and 24.

Each of the head pieces carries a swivel-like bearing 13 in which is journaled a shaft 9. Mounted for independent rotation on said shaft adjacent to one end of the latter is a bevel pinion 8 which is disposed in operative relation to the adjacent bevel gear 23 and upon which is rigidly mounted the hub portion 31 of a disk or wheel 32 adapted to be rotated by hand in effecting roll adjustments, as will hereinafter be explained. A second bevel pinion 10 operatively engaged with the bevel gear 24 is rigidly mounted upon the shaft 9.

The wheel 32 is herein shown as having a tubular rim 1 affording a convenient form of hand-grasp to be employed in effecting hand rotation thereof.

Figure 2:
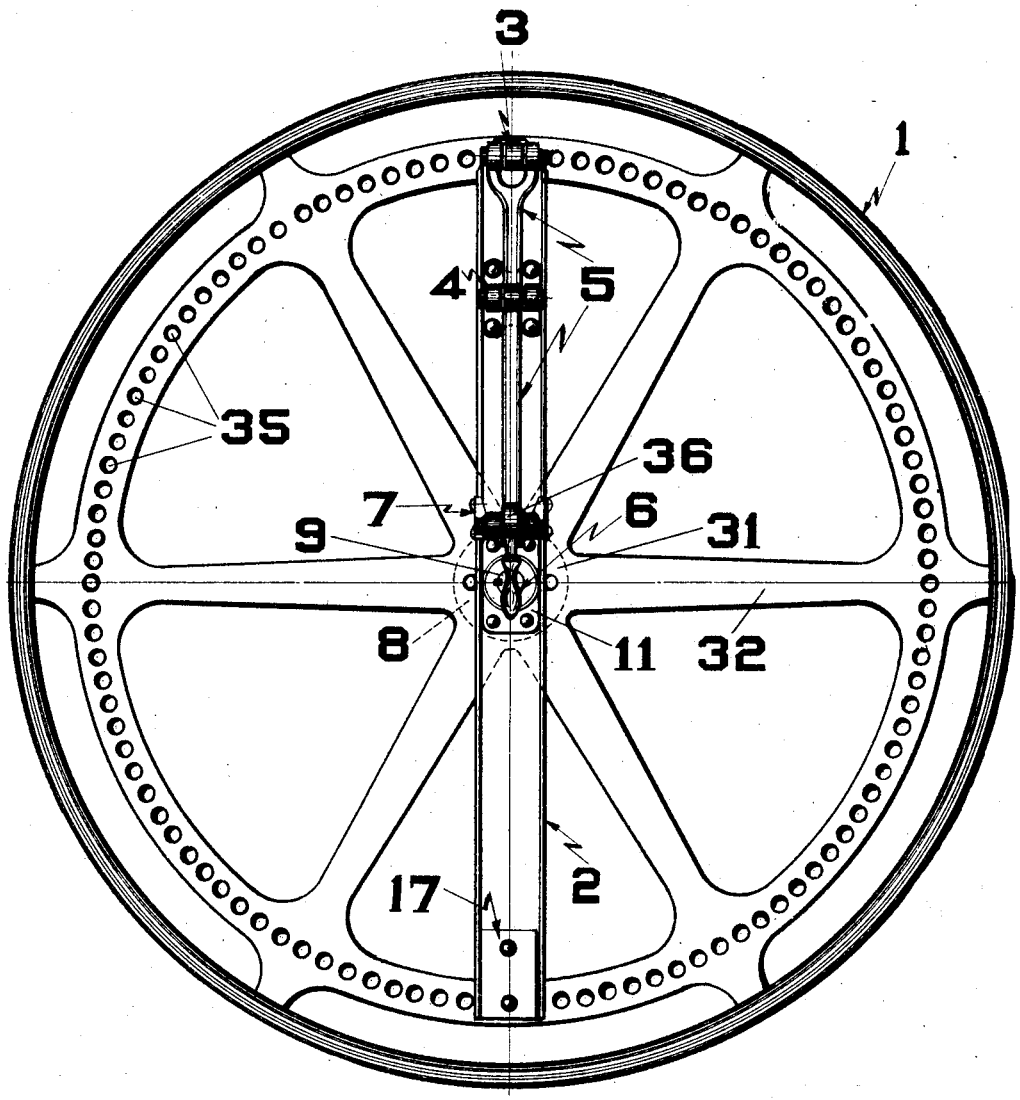
Figure 2 is an outer face view of the adjusting wheel and the parts carried thereby; and—

Fixed upon the shaft 9 adjacent to the outer end of the hub portion of the pinion 8 is a hub 11 upon which is carried a bar 2, herein shown as of channel-iron form, which lies in diametrical crossing relation to the wheel 32, as is shown in Figs. 1 and 2. Pivotally mounted intermediate its ends upon said bar 2, or upon a bracket 4 carried by said bar, is a lever 5 which has pivoted upon the forward end thereof one end of a pin 3. Said pin is movable through a guide-hole 34 provided therefor in said bar 2 and is adapted to be engaged with any one of numerous small holes or seats 35 provided in a circular row in the wheel 32, said row being located inwardly with respect to and concentric with the rim 1 and said holes having an arrangement in closely spaced relation, as shown in Fig. 2. A spring 12 carried by the bar 2 underlies the opposite end of the lever 5 for normally maintaining the latter in a position wherein the thereby-carried pin 3 is projected through a registering hole 35 of the wheel 32, thus to render the shaft 9 rotatable with said wheel. Pivotally mounted in an appropriate position on the bracket 7 carried by the bar 2 is a cam 36 having its face disposed in engagement with said lever 5. Said cam has associated therewith a hand lever 6 whereby rotary movement may be imparted thereto for thrusting inward the rear end of the lever 5 against the tension of the spring 12 for effecting withdrawal of the pin 3 from the engaged hole 35 of the wheel 32 to release the latter.

As is made manifest by the foregoing description, the end of the roll adjacent to the screw operator's end of the mill may be independently adjusted by rotation of the hand wheel 32 following disengagement of the latter from the shaft 9, effected by rotation of the cam 36 to the position in which the lever-carried pin 3 is disengaged from said wheel. Also, the opposite end of said roll may be independently adjusted by rotation of the bar 2 following disengagement of the wheel from the shaft, effected in the manner just described. Or, the two ends of the roll may be uniformly adjusted by rotation of the wheel when the latter is interengaged with the shaft 9 through the intermediacy of the pin 3, bar 2 and hub.

A counterweight 17 is preferably carried by the bar 2 at the end opposite that on which the lever 5 is mounted, said counterweight being employed to balance the weight of the two ends.

The alternate structure disclosed in Fig. 3 is designed for use in cases where it is desirable or necessary to locate the pinion 8ª at the side of the bevel gear 23 opposite the hand wheel. In this arrangement the pinion is fixed upon the inner end of a sleeve 14 which embraces the shaft 9 and which is rotatable in the bearing 13. Fixed upon the outer end of said sleeve is a collar 15 upon which is mounted the hub portion 31 of the wheel 32. Obviously, the operations to effect the different adjustments are precisely the same as in the case of employment of the construction shown in Figs. 1 and 2.

What is claimed is—

1. In a roll adjusting device, screws for the rolls, gears connected to the screws, a shaft, a pinion fixed to the shaft and in mesh with one of the gears, a pinion loose on the shaft and in mesh with the other gear, a hand wheel rigidly connected to the last named pinion and having a circular series of openings, a bar rigidly connected to the shaft and extending diametrically across the hand wheel for manually rotating the shaft, a spring tensioned lever pivoted to the bar, and a pin carried by the lever and engageable in one of the openings of the wheel.

2. In a roll adjusting device, screws for the rolls, gears connected to the screws, a shaft, a pinion fixed to the shaft and in mesh with one of the gears, a pinion loose on the shaft and in mesh with the other gear, a hand wheel rigidly connected to the last named pinion, and having a circular series of openings, a member rigidly connected to the shaft and extending diametrically across the hand wheel for manually rotating the shaft, and means carried by said member and engageable in a selected aperture of the series of apertures for locking said member and hand wheel together.

3. In a roll adjusting device, screws for the rolls, gears connected to the screws, a shaft, a pinion fixed to the shaft and in mesh with one of the gears, a pinion loose on the shaft and in mesh with the other gear, a hand wheel rigidly connected to the last named pinion, a member rigidly connected to the shaft and extending diametrically of the hand wheel for manually rotating the shaft, and means to lock the member and hand wheel together at selected points throughout the circumference of the hand wheel.

In testimony whereof, I affix my signature.

CHARLES H. MANION.